US012223875B2

(12) United States Patent
Li et al.

(10) Patent No.: US 12,223,875 B2
(45) Date of Patent: Feb. 11, 2025

(54) METHOD AND APPARATUS FOR COMPENSATING FOR BRIGHTNESS OF DISPLAY PANEL, DISPLAY DEVICE, AND STORAGE MEDIUM

(71) Applicants: Chengdu BOE Optoelectronics Technology Co., Ltd., Sichuan (CN); BOE Technology Group Co., Ltd., Beijing (CN)

(72) Inventors: Zewen Li, Beijing (CN); Hengzhen Liang, Beijing (CN); Lianbin Liu, Beijing (CN); Wenxiao Niu, Beijing (CN); Can Xiao, Beijing (CN); Yingjun Deng, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/028,358

(22) PCT Filed: Apr. 28, 2022

(86) PCT No.: PCT/CN2022/089958
§ 371 (c)(1),
(2) Date: Mar. 24, 2023

(87) PCT Pub. No.: WO2023/206258
PCT Pub. Date: Nov. 2, 2023

(65) Prior Publication Data
US 2024/0312385 A1 Sep. 19, 2024

(51) Int. Cl.
*G09G 3/20* (2006.01)
*G09G 3/3208* (2016.01)

(52) U.S. Cl.
CPC ......... *G09G 3/2007* (2013.01); *G09G 3/3208* (2013.01); *G09G 2320/0233* (2013.01)

(58) Field of Classification Search
CPC ............... G09G 3/2007; G09G 3/3208; G09G 2320/0233; G09G 3/20; G09G 3/34
See application file for complete search history.

(56) References Cited

U.S. PATENT DOCUMENTS 11,908,426 B2 * 2/2024 Zhang .................. G09G 3/3208
2016/0293109 A1 10/2016 Yang et al.
(Continued)

FOREIGN PATENT DOCUMENTS

CN 110428783 A 11/2019
CN 110444152 A 11/2019
(Continued)

*Primary Examiner* — Grant Sitta
(74) *Attorney, Agent, or Firm* — IPro, PLLC

(57) ABSTRACT

The present application discloses a method and an apparatus for compensating for brightness of a display panel, a display device, and a storage medium, and belongs to the field of display technologies. The method comprises: acquiring a brightness value of the display panel; acquiring, based on the brightness value of the display panel, a compensation function corresponding to the brightness value, and compensation parameters of the compensation function; and compensating for the brightness of the display panel by using the compensation function corresponding to the brightness value, the a degree at which the brightness of the image to be displayed by the display panel is compensated is negatively correlated with the brightness value of the display panel.

14 Claims, 5 Drawing Sheets

(56) References Cited

U.S. PATENT DOCUMENTS

| | | | | |
|---|---|---|---|---|
| 2017/0323619 A1* | 11/2017 | Lee | .......................... | G09G 5/10 |
| 2021/0166654 A1* | 6/2021 | Yu | .......................... | G09G 3/2011 |
| 2021/0327343 A1* | 10/2021 | Han | .......................... | G09G 3/3225 |
| 2021/0358406 A1* | 11/2021 | Zhang | .......................... | G09G 3/3233 |
| 2022/0165220 A1* | 5/2022 | Kim | .......................... | G09G 5/10 |
| 2022/0172664 A1* | 6/2022 | Park | .......................... | G09G 3/2074 |
| 2022/0215790 A1* | 7/2022 | Hei | .......................... | G09G 3/3208 |
| 2023/0069956 A1* | 3/2023 | Chen | .......................... | G09G 3/2092 |
| 2023/0075213 A1* | 3/2023 | Chen | .......................... | G09G 3/2003 |
| 2023/0186815 A1* | 6/2023 | Gao | .......................... | G09G 3/2003<br>345/690 |
| 2024/0005887 A1* | 1/2024 | Chen | .......................... | G09G 3/006 |
| 2024/0013698 A1* | 1/2024 | Lin | .......................... | G09G 3/20 |
| 2024/0038198 A1* | 2/2024 | Wang | .......................... | G09G 3/2011 |
| 2024/0054950 A1* | 2/2024 | Hou | .......................... | G09G 3/3208 |
| 2024/0096272 A1* | 3/2024 | Wang | .......................... | G09G 3/3208 |

FOREIGN PATENT DOCUMENTS

| | | | | |
|---|---|---|---|---|
| CN | 110648640 A | 1/2020 | | |
| CN | 113140178 A | 7/2021 | | |
| CN | 113707088 A | 11/2021 | | |
| CN | 113724652 A | 11/2021 | | |
| CN | 113823235 A | 12/2021 | | |
| CN | 113920939 A | 1/2022 | | |
| WO | WO-2019210687 A1 * | 11/2019 | ............. | G09G 3/006 |

* cited by examiner

METHOD AND APPARATUS FOR COMPENSATING FOR BRIGHTNESS OF DISPLAY PANEL, DISPLAY DEVICE, AND STORAGE MEDIUM

The present application is a U.S. national stage of PCT Patent Application Serial No. PCT/CN2022/089958, filed on Apr. 28, 2022 and entitled "METHOD AND APPARATUS FOR COMPENSATING FOR BRIGHTNESS OF DISPLAY PANEL, DISPLAY DEVICE, AND STORAGE MEDIUM", the entire contents of which are incorporated herein by reference.

TECHNICAL FIELD

The present application relates to the field of display technologies, and in particular, to a method and an apparatus for compensating for brightness of a display panel, a display device, and a storage medium.

BACKGROUND OF THE INVENTION

Self-luminous display panels have advantages such as fast response, wide viewing angle, high brightness, bright color, light weight, and slimness. However, due to reasons in the production process of the self-luminous display panels or their losses in the use, brightness unevenness (i.e., mura) is prone to occur to a displayed picture. The demura technology is a technology that detects and eliminates the mura phenomenon in display panels to make the displayed picture have even brightness.

A process of detecting mura in the display panel includes: controlling the display panel to display an image; acquiring an image corresponding to the image by a charge coupled device (CCD) camera; and acquiring brightness values of individual pixels in the image, and analyzing the brightness values to determine an area to which the mura occurs in a displayed picture. A process of eliminating mura includes: adjusting brightness for an area to which mura occurs in a displayed picture, such that an area that is too dark becomes brighter and an area that is too bright darkens to achieve an even display effect.

However, the effect of compensating for the brightness for displaying the picture of the display panel is poor at present, resulting in a poor effect for the display panel to display the picture after brightness compensation.

SUMMARY OF THE INVENTION

Embodiments of the present application provides a method and an apparatus for compensating for brightness of a display panel, a display device, and a storage medium.

In one aspect, a method for compensating for brightness of a display panel is provided.

The method includes:

acquiring a brightness value of the display panel when the display panel is displaying a picture;

acquiring, based on the brightness value of the display panel, a compensation function corresponding to the brightness value, and compensation parameters of the compensation function; and compensating for the brightness of an image to be displayed by the display panel by using the compensation function corresponding to the brightness value;

wherein a degree at which the brightness of the image to be displayed by the display panel is compensated is negatively correlated with the brightness value of the display panel.

Optionally, acquiring, based on the brightness value of the display panel, a compensation function corresponding to the brightness value, and compensation parameters of the compensation function, includes:

acquiring the compensation function corresponding to the brightness value, based on the brightness value of the display panel and a first corresponding relationship between brightness values of the display panel and compensation functions; and acquiring the compensation parameters of the compensation function corresponding to the brightness value, based on the brightness value of the display panel and a second corresponding relationship between the brightness values of the display panel and groups of compensation parameters.

Optionally, compensating for the brightness of an image to be displayed by the display panel by using the compensation function corresponding to the brightness value, includes:

compensating for the brightness of the image to be displayed by the display panel by using a first compensation function, after the brightness value of the display panel is determined to be within a first brightness range based on the brightness value of the display panel; and compensating for the brightness of the image to be displayed by the display panel by using a second compensation function, after the brightness value of the display panel is determined to be within a second brightness range based on the brightness value of the display panel, wherein the first corresponding relationship is recorded as: a corresponding relationship between the first brightness range and the first compensation function, and a corresponding relationship between the second brightness range and the second compensation function; and a lower limit value of the first brightness range is greater than an upper limit value of the second brightness range, and a degree at which the brightness of the image to be displayed by the display panel is compensated by using the first compensation function is smaller than a degree at which the brightness of the image to be displayed by the display panel is compensated by using the second compensation function.

Optionally, the first compensation function is:

$$Y = \text{Gain} * X * G' + \text{Offset} * O';$$

wherein Y represents a grayscale after the brightness is compensated; X represents a grayscale before the brightness is compensated; Gain and Offset are both compensation parameters; G' is a gain adjustment parameter for the compensation parameter Gain; and O' is a gain adjustment parameter for the compensation parameter Offset.

Optionally, the second compensation function is:

$$Y = \text{Beta} * X^2 + \text{Gain} * X + \text{Offset} * O';$$

wherein Y represents a grayscale after the brightness is compensated; X represents a grayscale before the brightness is compensated; Beta, Gain, and Offset are all compensation parameters; B' is a gain adjustment parameter for the compensation parameter Bet; G' is a gain adjustment parameter for the compensation parameter Gain; and O' is a gain adjustment parameter for the compensation parameter Offset.

Optionally, compensating for the brightness of an image to be displayed by the display panel by using the compensation function corresponding to the brightness value, further includes:

compensating for the brightness of the image to be displayed by the display panel by using a third compensation function, after the brightness value of the display panel is determined to be within a third brightness range based on the brightness value of the display panel, wherein the first corresponding relationship is further recorded as: a corresponding relationship between the third brightness range and the third compensation function, and an upper limit value of the third brightness range is smaller than an upper limit value of the first brightness range, and greater than the upper limit value of the second brightness range.

Optionally, the third compensation function is:

$$Y=\text{Beta}*X^2+\text{Gain}*X+\text{Offset}*O',$$

wherein Y is a grayscale after the brightness is compensated; X is a grayscale before the brightness is compensated; Beta, Gain, and Offset are all compensation parameters of the third compensation function; and O' is a gain adjustment parameter for the compensation parameter Offset.

Optionally, before acquiring the brightness value of the display panel when the display panel is displaying the picture, the method further includes:

acquiring the first corresponding relationship between brightness values of the display panel and compensation functions, and the second corresponding relationship between the brightness values of the display panel and groups of compensation parameters.

In another aspect, an apparatus for compensating for brightness of a display panel is provided. The apparatus includes:

a first acquisition module configured to acquire a brightness value of the display panel when the display panel is displaying a picture;

a second acquisition module configured to acquire, based on the brightness value of the display panel, a compensation function corresponding to the brightness value, and compensation parameters of the compensation function; and a brightness compensation module configured to compensate for the brightness of an image to be displayed by the display panel by using the compensation function corresponding to the brightness value;

wherein a degree at which the brightness of the image to be displayed by the display panel is compensated is negatively correlated with the brightness value of the display panel.

Optionally, the second acquisition module is configured to:

acquire the compensation function corresponding to the brightness value, based on the brightness value of the display panel and a first corresponding relationship between brightness values of the display panel and compensation functions; and acquire the compensation parameters of the compensation function corresponding to the brightness value, based on the brightness value of the display panel and a second corresponding relationship between the brightness values of the display panel and groups of compensation parameters.

Optionally, the brightness compensation module includes:

a first compensation unit configured to compensate for the brightness of the image to be displayed by the display panel by using a first compensation function, after the brightness value of the display panel is determined to be within a first brightness range based on the brightness value of the display panel; and a second compensation unit configured to compensate for the brightness of the image to be displayed by the display panel by using a second compensation function, after the brightness value of the display panel is determined to be within a second brightness range based on the brightness value of the display panel, wherein the first corresponding relationship is recorded as: a corresponding relationship between the first brightness range and the first compensation function, and a corresponding relationship between the second brightness range and the second compensation function; and a lower limit value of the first brightness range is greater than an upper limit value of the second brightness range, and a degree at which the brightness of the image to be displayed by the display panel is compensated by using the first compensation function is smaller than a degree at which the brightness of the image to be displayed by the display panel is compensated by using the second compensation function.

Optionally, the first compensation function is:

$$Y=\text{Gain}*X*G'+\text{Offset}*O';$$

wherein Y represents a grayscale after the brightness is compensated; X represents a grayscale before the brightness is compensated; Gain and Offset are both compensation parameters; G' is a gain adjustment parameter for the compensation parameter Gain; and O' is a gain adjustment parameter for the compensation parameter Offset; and the second compensation function is:

$$Y=\text{Beta}*X^2*B'+\text{Gain}*X*G'+\text{Offset}*O';$$

wherein Y represents a grayscale after the brightness is compensated; X represents a grayscale before the brightness is compensated; Beta, Gain, and Offset are all compensation parameters; B' is a gain adjustment parameter for the compensation parameter Bet; G' is a gain adjustment parameter for the compensation parameter Gain; and O' is a gain adjustment parameter for the compensation parameter Offset.

Optionally, the brightness compensation module further includes:

a third compensation unit configured to compensate for the brightness of the image to be displayed by the display panel by using a third compensation function after the brightness value of the display panel is determined to be within a third brightness range based on the brightness value of the display panel, wherein the first corresponding relationship is further recorded as: a corresponding relationship between the third brightness range and the third compensation function, and an upper limit value of the third brightness range is smaller than an upper limit value of the first brightness range, and greater than the upper limit value of the second brightness range.

In still another aspect, a display device is provided. The display device includes: a display panel, a processor, and a memory for storing at least one executable instruction of the processor, wherein the processor is configured to execute the method for compensating for the brightness of the display panel as described above.

In further another aspect, a computer-readable storage medium is provided. The computer-readable storage medium stores at least one instruction therein, wherein when the computer-readable storage medium runs on a processing component, the processing component is caused to execute the method for compensating for the brightness of the display panel as described above.

The technical solutions according to the embodiments of the present application at least include the following beneficial effects.

The brightness value of a display panel is acquired when the display panel is displaying a picture; a corresponding compensation function is acquired according to the brightness of the display panel; and the brightness is compensated of an image to be displayed by the display panel, according to the corresponding compensation function. In this way, when the brightness for the display panel to display a picture is high (that is, the display panel displays a high-DBV displayed picture), the brightness can be compensated of the image to be displayed by the display panel by using a compensation function with a low degree of brightness compensation, which can then reduce the probability of a compensation transition problem that occurs when the brightness is compensated for the high-DBV displayed picture. When the brightness for the display panel to display a picture is high (that is, the display panel displays a high-DBV displayed picture), the brightness can be compensated of the image to be displayed by the display panel by using a compensation function with a low degree of brightness compensation, which can then reduce the degree of compensation for the brightness of the high-DBV displayed picture, thereby reducing the probability of spots that occur to the displayed picture after the brightness is compensated. When the brightness for the display panel to display a picture is low (that is, the display panel displays a low-DBV displayed picture), the brightness can be compensated of the image to be displayed by the display panel by using a compensation function with a high degree of brightness compensation, which can then increase the degree of compensation for the brightness of the low-DBV displayed picture, thereby reducing the probability that dark lines occurring in the displayed picture after the brightness is compensated cannot be completely eliminated. In this way, the effect of compensating for the brightness for displaying the picture of the display panel can be effectively improved, which can then improve the effect of the picture of the display panel after the brightness is compensated.

DETAILED DESCRIPTION

To describe the objectives, technical solutions, and advantages of the present application more clearly, the embodiments of the present application are further described in detail hereinafter in conjunction with the accompanying drawings.

Compared with a liquid crystal display (LCD) panel, a self-luminous display panel can emit light autonomously without the provision of a backlight, which helps to achieve light weight and slimness for the display panel. Therefore, the self-luminous display panel has been more and more commonly used in display devices. The self-luminous display panel may be an organic light-emitting diode (OLED) display panel or a quantum dot light-emitting diode (QLED).

In the process of manufacturing the self-luminous display panel, there may be foreign objects attached to the glass substrate and film layer of the self-luminous display panel, resulting in brightness unevenness of the self-luminous display panel. Or, due to the mobility of the thin-film transistor itself and the inconsistency of electrical parameters such as threshold voltage, brightness unevenness may also occur to the self-luminous display panel, that is, mura may be caused. With flexibility and simplicity, the demura technology has been widely used by major manufacturers of self-luminous display panels to detect and eliminate the mura in the self-luminous display panels.

A demura process for a self-luminous display panel mainly includes: acquiring brightness distribution of the display panel (pre-processing) and calculating compensation data (post-processing). During the pre-processing, the displayed picture of the self-luminous display panel may be acquired by a CCD camera to acquire the brightness distribution of the self-luminous display panel. During the post-processing, the brightness of each pixel in an image of the acquired displayed picture may be adjusted pixel by pixel, thereby achieving brightness evenness for the self-luminous display panel by making the brightness values of all pixels consistent. In this way, the compensation parameters of the compensation function may be acquired during the post-processing, and afterwards, when the self-luminous display panel displays the picture normally, the brightness can be compensated for the displayed picture based on this compensation function and the compensation parameters of the compensation function.

In related technologies, the same compensation function is used when the brightness is compensated for the displayed pictures of different display brightness values (DBVs) of the display panel. However, for a high-DBC displayed picture, mura is not significant; and for a low-DBV displayed picture, mura is more significant.

Figure 1:
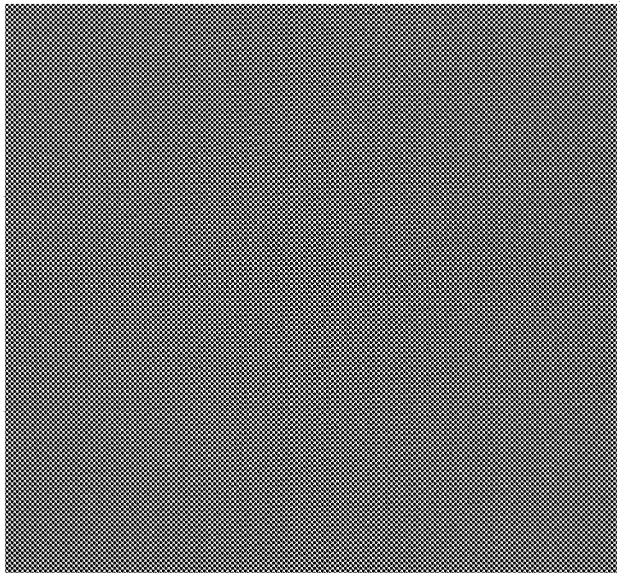
FIG. 1 is a diagram showing an effect achieved after brightness is compensated for a high-DBV displayed picture.

Referring to FIG. 1 which is a diagram showing an effect achieved after the brightness is compensated for a high-DBV displayed picture, if the same compensation function is used to compensate for the brightness of the high-DBV displayed picture, there may be a problem of compensation transition to result in spots that easily occur to the displayed picture after the brightness is compensated.

Figure 2:
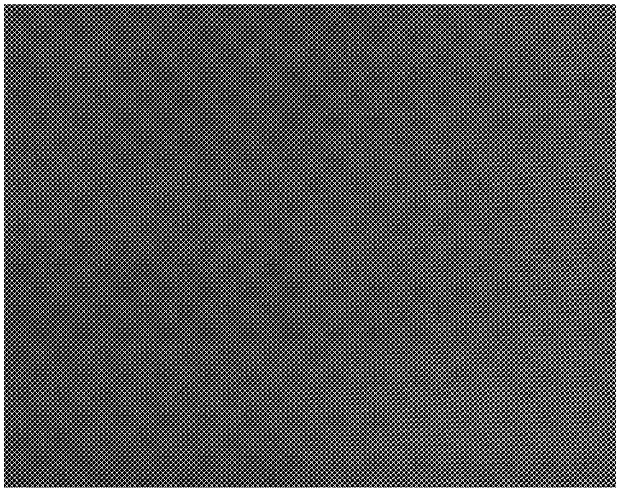
FIG. 2 is a diagram showing an effect achieved after brightness is compensated for a low-DBV displayed picture.

Referring to FIG. 2 which is a diagram showing an effect achieved after the brightness is compensated for a low-DBV displayed picture, if the same compensation function is used to compensate for the brightness of the low-DBV displayed picture, there may be a problem of insufficient compensation to result in dark lines that cannot be completely eliminated from the displayed picture after the brightness is compensated.

To this end, the effect of compensating for the brightness for displaying the picture of the display panel is poor at present, resulting in a poor effect for the display panel to display the picture after brightness compensation.

Figure 3:
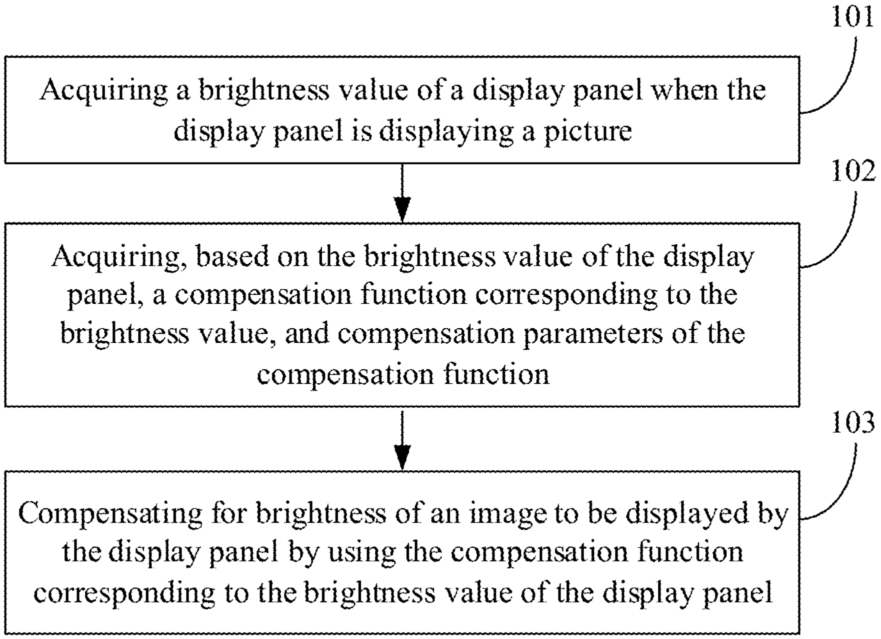
FIG. 3 shows a method for compensating for brightness of a display panel according to an embodiment of the present application.

Referring to FIG. 3, it shows a method for compensating for brightness of a display panel according to an embodiment of the present application. The method for compensating for the brightness of the display panel is applied to a display device, and may include the following steps.

In step 101, the brightness value of a display panel is acquired when the display panel is displaying a picture.

In step 102, a compensation function corresponding to the brightness value, and compensation parameters of the compensation function are acquired based on the brightness value of the display panel.

In step 103, the brightness is compensated of an image to be displayed by the display panel by using the compensation function corresponding to the brightness value of the display panel.

The degree at which the brightness of the image to be displayed by the display panel is compensated is negatively correlated with the brightness value of the display panel.

In summary, according to the method for compensating for the brightness of the display panel according to the embodiments of the present application, the brightness value of the display panel is acquired when the display panel is displaying a picture; a corresponding compensation function is acquired according to the brightness of the display panel; and the brightness is compensated of an image to be displayed by the display panel, according to the corresponding compensation function. In this way, when the brightness for the display panel to display a picture is high (that is, the display panel displays a high-DBV displayed picture), the brightness can be compensated of the image to be displayed by the display panel by using a compensation function with a low degree of brightness compensation, which can then reduce the probability of a compensation transition problem that occurs when the brightness is compensated for the high-DBV displayed picture. When the brightness for the display panel to display a picture is high (that is, the display panel displays a high-DBV displayed picture), the brightness can be compensated of the image to be displayed by the display panel by using a compensation function with a low degree of brightness compensation, which can then reduce the degree of compensation for the brightness of the high-DBV displayed picture, thereby reducing the probability of spots that occur to the displayed picture after the brightness is compensated. When the brightness for the display panel to display a picture is low (that is, the display panel displays a low-DBV displayed picture), the brightness can be compensated of the image to be displayed by the display panel by using a compensation function with a high degree of brightness compensation, which can then increase the degree of compensation for the brightness of the low-DBV displayed picture, thereby reducing the probability that dark lines occurring in the displayed picture after the brightness is compensated cannot be completely eliminated. In this way, the effect of compensating for the brightness for displaying the picture of the display panel can be effectively improved, which can then improve the effect of the picture of the display panel after the brightness is compensated.

Figure 4:
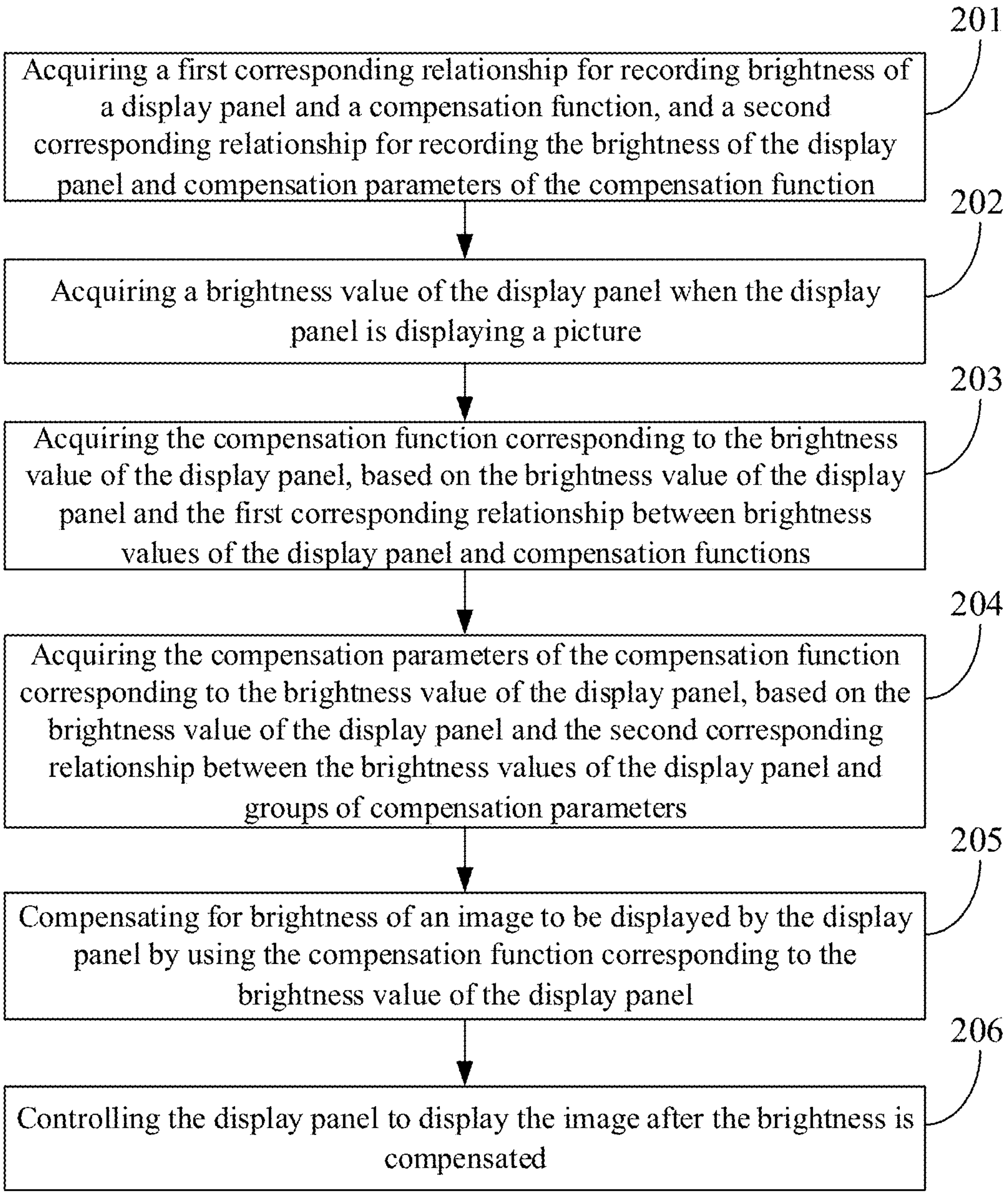
FIG. 4 shows another method for compensating for brightness of a display panel according to an embodiment of the present application.

Referring to FIG. 4, it shows another method for compensating for brightness of a display panel according to an embodiment of the present application. The method for compensating for the brightness of the display panel (which may be a self-luminous display panel) is applied to a display device, and may include the following steps.

In step 201, a first corresponding relationship for recording brightness of a display panel and a compensation function, and a second corresponding relationship for recording the brightness of the display panel and compensation parameters of the compensation function are acquired.

In an embodiment of the present application, the display device may acquire the first corresponding relationship between brightness values of the display panel and compensation functions, and the second corresponding relationship between the brightness values of the display panel and groups of compensation parameters.

Optionally, the first corresponding relationship is recorded as: a corresponding relationship between the first brightness range and the first compensation function, and a corresponding relationship between the second brightness range and the second compensation function. Here, a lower limit value of the first brightness range is greater than an upper limit value of the second brightness range. That is, when the brightness for the display panel to display a picture is within the first brightness range, the picture displayed by the display panel is a high-DBV displayed picture; and when the brightness for the display panel to display a picture is within the second brightness range, the picture displayed by the display panel is a low-DBV displayed picture. Here, the degree at which the brightness is compensated, by the display device using the first compensation function, of the image to be displayed by the display panel is smaller than the degree at which the brightness is compensated, by the display device using the second compensation function, of the image to be displayed by the display panel.

In the present application, the first corresponding relationship is further recorded as: a corresponding relationship between the third brightness range and the third compensation function. Here, an upper limit value of the third brightness range is smaller than an upper limit value of the first brightness range, and greater than the upper limit value of the second brightness range. That is, when the brightness for the display panel to display a picture is within the third brightness range, the picture displayed by the display panel is a medium-DBV displayed picture. Here, the degree at which the brightness is compensated, by the display device using the third compensation function, of the image to be displayed by the display panel is greater than the degree at which the brightness is compensated, by the display device using the first compensation function, of the image to be displayed by the display panel, and smaller than the degree at which the brightness is compensated, by the display device using the second compensation function, of the image to be displayed by the display panel.

In this way, the degree at which the brightness of the image to be displayed by the display panel is compensated is negatively correlated with the brightness value of the display panel.

In an embodiment of the present application, the brightness for the display panel to display a picture may be uniformly divided into a plurality of brightness intervals, and the first brightness range, second brightness range, and third brightness range recorded in the first corresponding relationship each include at least one brightness interval.

As an example, it is assumed that the plurality of brightness intervals may be: a brightness interval 1, a brightness interval 2, a brightness interval 3, a brightness interval 4, a brightness interval 5, a brightness interval 6, a brightness interval 7, a brightness interval 8, and a brightness interval 9, respectively, and the brightness in each brightness interval gradually decreases in an order from the brightness interval 1 to the brightness interval 9. Then, the first brightness range may include: a brightness interval 1, the second brightness range may include: a brightness interval 8 and a brightness interval 9, and the third brightness range may include: a brightness range 2 to a brightness interval 7.

In the present application, the compensation parameters recorded in the second corresponding relationship may include: a plurality of compensation parameters, and gain adjustment parameters of the individual compensation parameters. For example, the plurality of compensation parameters is: Beta, Gain, and Offset, respectively. The value of the same compensation parameter for different compensation functions is the same, but the gain adjustment parameters of the individual compensation parameters are related to the brightness for the display panel to display the picture. For example, in the first brightness range, second brightness range, and third brightness range, different brightness intervals may correspond to different gain adjustment parameters. Here, the corresponding relationship between the brightness of the display panel and the gain adjustment parameter of each compensation parameter may be recorded by means of the second corresponding relationship.

As an example, the first compensation function is: $Y=Gain*X*G'+Offset*O'$;

the second compensation function is: $Y=Beta*X^2*B'+Gain*X*G'+Offset*O'$; and the third compensation function is: $Y=Beta*X^2+Gain*X+Offset*O'$.

Here, Y represents a grayscale after the brightness is compensated; X represents a grayscale before the brightness is compensated; Beta, Gain, and Offset are all compensation parameters; B' is a gain adjustment parameter for the compensation parameter Bet; G' is a gain adjustment parameter for the compensation parameter Gain; and O' is a gain adjustment parameter for the compensation parameter Offset.

Here, the values of the compensation parameters Beta in the individual compensation functions are the same; the values of the compensation parameters Gain in the individual compensation functions are the same; and the values of the compensation parameters Offset in the individual compensation functions are the same. However, the values of the gain adjustment parameters of the individual compensation parameters corresponding to different brightness intervals are different, such that the compensation functions may compensate for the brightness of the displayed picture under different brightness intervals to different degrees.

As an example, it is assumed that the first brightness range includes: a brightness interval 1, the second brightness range includes: a brightness interval 8 and a brightness interval 9, and the third brightness range includes: a brightness range 2 to a brightness interval 7. Then, the gain adjustment parameters of the individual compensation parameters corresponding to the brightness interval 1 are: a gain adjustment parameter G' of the compensation parameter Gain and a gain adjustment parameter O' of the compensation parameter Offset; the gain adjustment parameters of the individual compensation parameters corresponding to the brightness intervals 8 and 9 are: a gain adjustment parameter B' of the compensation parameter Beta, a gain adjustment parameter G' of the compensation parameter Gain, and a gain adjustment parameter O' of the compensation parameter Offset; and the gain adjustment parameter of the individual compensation parameters corresponding to the brightness intervals 2 to 7 is: a gain adjustment parameter O' of the compensation parameter Offset. The values of the gain adjustment parameters of the compensation parameters corresponding to the individual brightness intervals are different.

It should be noted that the first compensation function pertains to a primary compensation function, and the second compensation function and the third compensation function are both secondary compensation functions. To this end, the degree at which the brightness is compensated, by the display device using the first compensation function, of the image to be displayed by the display panel is smaller than the degree at which the brightness is compensated, by the display device using the second or third compensation function, of the image to be displayed by the display panel.

It should also be noted that, compared with the third compensation function, the gain adjustment parameter B' of the compensation parameter Beta and the gain adjustment parameter G' of the compensation parameter Gain are introduced into the second compensation function, and the values of the gain adjustment parameter B' and the gain adjustment parameter G' are generally greater than or equal to 1. To this end, the degree at which the brightness is compensated, by the display device using the second compensation function, of the image to be displayed by the display panel is greater than the degree at which the brightness is compensated, by the display device using the third compensation function, of the image to be displayed by the display panel.

In an embodiment of the present application, the display device before leaving the factory needs to undergo a process of demuraing the display panel, and after the process of demuraing the display panel, the compensation parameters of the individual compensation functions corresponding to different brightness intervals may be acquired. Then, these compensation parameters and compensation functions are stored in a memory of the display device, such that the display device may subsequently acquire, from those stored therein, a first corresponding relationship for recording brightness of a display panel and a compensation function, and a second corresponding relationship for recording the brightness of the display panel and compensation parameters of the compensation function.

The compensation parameters Beta, Gain, and Offset in the compensation parameters are acquired as follows.

A display device controls a display panel to display a plurality of solid-color pictures at certain brightness (which may be located in any brightness interval), and the grayscales of the individual solid-color pictures are different. Each solid-color picture displayed by the display panel is separately acquired by a CCD camera to acquire a plurality of photos with mura. The plurality of photos with mura are pre-processed and post-processed respectively to acquire the compensation parameters Beta, Gain, and Offset. The acquired compensation parameters Beta, Gain, and Offset may be stored in a binary document (bin document), and each compensation parameter stored in the bin document may be directly called afterwards.

The gain adjustment parameters of the individual compensation parameters in the compensation parameters are acquired as follows.

A computer device may respectively calculate the gain adjustment parameters of the individual compensation parameters corresponding to different brightness intervals by using an algorithm based on the difference between different brightness. Here, the errors of the gain adjustment parameters calculated by the computer device using the algorithm are large. To this end, after the gain adjustment parameters of the individual compensation parameters corresponding to different brightness intervals are calculated, the calculated results also need to be verified.

As an example, for the gain adjustment parameters of the individual compensation parameters corresponding to a brightness interval (e.g., brightness interval 1), after the computer device calculates the values of the gain adjustment parameters corresponding to the brightness interval by using the algorithm, a plurality of values near this value is taken as values to be tested, respectively. After that, the plurality of values to be tested may be entered into a plurality of sample display devices respectively, and the sample display devices compensate for the brightness for the displayed pictures based on the entered values, and then control the display panels to display the displayed pictures after the brightness is compensated. Then, a reference CCD camera shoots the pictures displayed by the plurality of sample display devices, respectively, and identifies the presence of mura in the pictures. Finally, the values entered by the sample display device with the least degree of mura may be determined as: final gain adjustment parameters of the individual compensation parameters corresponding to the current brightness interval.

Figure 5:
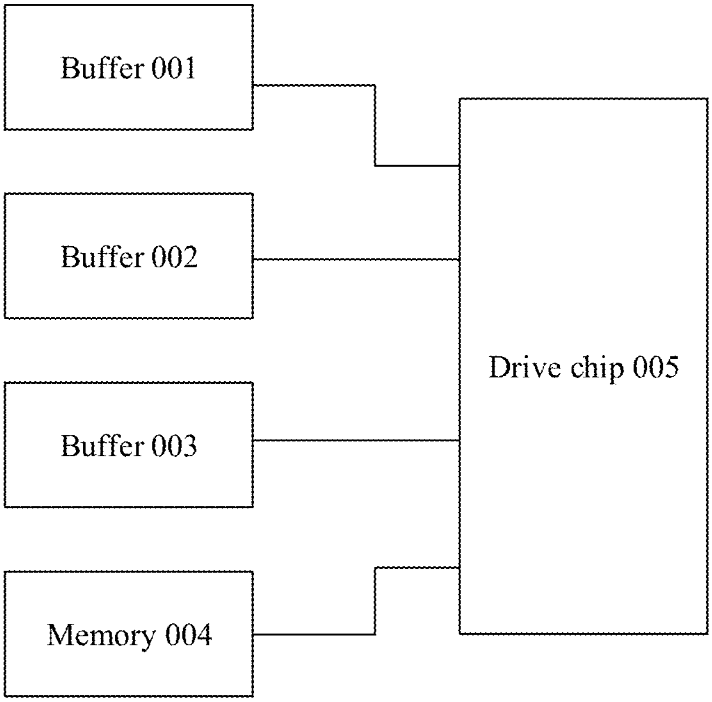
FIG. 5 is a schematic structural diagram of a sample display device according to an embodiment of the present application.

In the present application, as shown in FIG. 5, it is a schematic structural diagram of a sample display device according to an embodiment of the present application. The compensation parameters Beta, Gain, and Offset may be stored in a buffer 001, a buffer 002, and a buffer 003, respectively, and the values to be tested of the gain adjustment parameters of the individual compensation parameters may be stored in an external memory 004. Moreover, the buffer 001, the buffer 002, the buffer 003, and the memory 004 may be all electrically connected to a drive chip 005. In this way, the drive chip 005 may read the data recorded in the buffer 001, the buffer 002, the buffer 003, and the memory 004, respectively, and compensate for the brightness of the displayed picture based on these read data.

In step 202, the brightness value of the display panel is acquired when the display panel is displaying a picture.

In an embodiment of the present application, the display device may acquire the brightness value of the display panel when the display panel is displaying a picture. The brightness value of the display panel when the display panel is displaying a picture is: information containing the brightness of the display panel.

As an example, the display device may acquire, based on a user triggering an instruction to adjust the brightness of the display panel, the brightness value of the display panel when the display panel is displaying a picture. An/or, the display device may acquire, based on the intensity of ambient light, the brightness value of the display panel when the display panel is displaying a picture.

Here, when the user needs to adjust the display panel, the user may trigger the instruction to adjust the brightness of the display panel, and the display device may adjust the brightness of the display panel according to this instruction. In this way, after the display device adjusts the brightness of the display panel, the display device may acquire the brightness value required for currently displaying a picture.

The display device may also automatically adjust the brightness of the display panel. The display device may acquire the intensity of ambient light by means of a light sensor integrated therein. When the display device determines that the intensity of the ambient light is strong, the display device may turn the brightness of the display panel up; and when the display device determines that the intensity of the ambient light is weak, the display device may turn the brightness of the display panel down. In this way, after the display device adjusts the brightness of the display panel, the display device may also acquire the brightness value required for currently displaying a picture.

In step 203, the compensation function corresponding to the brightness value of the display panel is acquired based on the brightness value of the display panel and the first corresponding relationship between brightness values of the display panel and compensation functions.

In an embodiment of the present application, the display device may acquire the compensation function corresponding to the brightness value of the display panel, based on the brightness value of the display panel and the first corresponding relationship between brightness values of the display panel and compensation functions.

As an example, if the display device after acquiring the brightness value of the display panel determines that the brightness of the display panel is within the first brightness range, the display device may determine based on the first corresponding relationship that: a compensation function corresponding to the brightness value of the display panel is the first compensation function; if the display device after acquiring the brightness value of the display panel determines that the brightness of the display panel is within the second brightness range, the display device may determine based on the first corresponding relationship that: a compensation function corresponding to the brightness value of the display panel is the second compensation function; and if the display device after acquiring the brightness value of the display panel determines that the brightness of the display panel is within the third brightness range, the display device may determine based on the first corresponding relationship that: a compensation function corresponding to the brightness value of the display panel is the third compensation function.

In step 204, the compensation parameters of the compensation function corresponding to the brightness value of the display panel are acquired based on the brightness value of the display panel and the second corresponding relationship between the brightness values of the display panel and groups of compensation parameters.

In an embodiment of the present application, the display device may acquire the compensation parameters of the compensation function corresponding to the brightness value of the display panel, based on the brightness value of the display panel and the second corresponding relationship between the brightness values of the display panel and groups of compensation parameters.

As an example, it is assumed that the first brightness range includes: a brightness interval 1, the second brightness range includes: a brightness interval 8 and a brightness interval 9, and the third brightness range includes: a brightness range 2 to a brightness interval 7. If the display device after acquiring the brightness value of the display panel determines that the brightness of the display panel is within the brightness interval 1, the display device may determine based on the second corresponding relationship: the value of the gain adjustment parameter G' of the compensation parameter Gain corresponding to the brightness interval 1, and the value of the gain adjustment parameter O' of the compensation parameter Offset. If the display device after acquiring the brightness value of the display panel determines that the brightness of the display panel is within the brightness interval 9, the display device may determine based on the second corresponding relationship: the value of the gain adjustment parameter B' of the compensation parameter Beta corresponding to the brightness interval 9, the value of the gain adjustment parameter G' of the compensation parameter Gain, and the value of the gain adjustment parameter O' of the compensation parameter Offset.

In step 205, the brightness is compensated of an image to be displayed by the display panel by using the compensation function corresponding to the brightness value of the display panel.

In an embodiment of the present application, after acquiring the compensation function corresponding to the brightness value of the display panel and the compensation parameters of the compensation function, the display device may compensate for the brightness of the image to be displayed by the display panel by using the compensation function corresponding to the brightness value of the display panel.

Since different display panels are different in brightness, the brightness of the display panel is compensated in different ways. Therefore, the embodiments of the present application are schematically illustrated by taking the following two possible implementations as an example.

In the first possible implementation, after determining, based on the brightness value of the display panel, that the brightness of the display panel is within the first brightness range, the display device may compensate for the brightness of the image to be displayed by the display panel by using the first compensation function.

Here, the first compensation function is a primary compensation function. Therefore, this first compensation function has a low degree of brightness compensation of the image to be displayed by the display panel, which can ensure that the probability of spots in the displayed picture is low when the display device compensates for the brightness of the high-DBV displayed picture and controls the display panel to display the high-DBV displayed picture after the brightness is compensated.

In the second possible implementation, after determining, based on the brightness value of the display panel, that the brightness of the display panel is within the second brightness range, the display device may compensate for the brightness of the image to be displayed by the display panel by using the second compensation function.

Here, the second compensation function is a secondary compensation function, and simultaneously introduces the gain adjustment parameter B' of the compensation parameter Beta, the gain adjustment parameter G' of the compensation parameter Gain, and the gain adjustment parameter O' of the compensation parameter Offset, with the values of the gain adjustment parameters B' and G' generally greater than or equal to 1. Therefore, this second compensation function has a high degree of brightness compensation of the image to be displayed by the display panel, which can ensure that the probability of dark lines in the displayed picture is low when the display device compensates for the brightness of the low-DBV displayed picture and controls the display panel to display the low-DBV displayed picture after the brightness is compensated.

In the third possible implementation, after determining, based on the brightness value of the display panel, that the brightness of the display panel is within the third brightness range, the display device may compensate for the brightness of the image to be displayed by the display panel by using the third compensation function.

Here, the third compensation function is a secondary compensation function, and only introduces the gain adjustment parameter O' of the compensation parameter Offset. Therefore, the degree of brightness compensation of this third compensation function of the image to be displayed by the display panel is higher than the degree of brightness compensation of the first compensation function of the image to be displayed by the display panel, and lower than the degree of brightness compensation of the second compensation function of the image to be displayed by the display panel, which can ensure that there is basically no mura in the displayed picture when the display device compensates for the brightness of the medium-DBV displayed picture and controls the display panel to display the medium-DBV displayed picture after the brightness is compensated.

In step 206, the display panel is controlled to display the image after the brightness is compensated.

In an embodiment of the present application, after compensating for the brightness of the image to be displayed by the display panel by using the compensation function corresponding to the brightness value of the display panel, the display device may control the display panel to display the image after the brightness is compensated. In the process of compensating, by the display device, for the brightness of the image to be displayed by the display panel, a correlation relationship between the brightness of the display panel and the obviousness of the occurred mura is considered. Therefore, the display device selects the compensation function of a different compensation degree according to the brightness of the display panel, and compensates, according to the selected compensation function, for the brightness of the image to be displayed by the display panel, which can ensure that a good display effect is achieved for the compensated image that is finally presented on the display panel.

It should be noted that the sequential order of the steps of the method for compensating for the brightness of the display panel according to the embodiments of the present application can be adjusted properly, and the steps may also be added or deleted accordingly as required. Any variations to the method readily conceivable to any person skilled in the art in the technical scope disclosed by the present application shall fall within the protection scope of the present application. Therefore, a detailed description will not be repeated here.

In summary, according to the method for compensating for the brightness of the display panel according to the embodiments of the present application, the brightness value of the display panel is acquired when the display panel is displaying a picture; a corresponding compensation function is acquired according to the brightness of the display panel; and the brightness is compensated of an image to be displayed by the display panel, according to the corresponding compensation function. In this way, when the brightness for the display panel to display a picture is high (that is, the display panel displays a high-DBV displayed picture), the brightness can be compensated of the image to be displayed by the display panel by using a compensation function with a low degree of brightness compensation, which can then reduce the probability of a compensation transition problem that occurs when the brightness is compensated for the high-DBV displayed picture. When the brightness for the display panel to display a picture is high (that is, the display panel displays a high-DBV displayed picture), the brightness can be compensated of the image to be displayed by the display panel by using a compensation function with a low degree of brightness compensation, which can then reduce the degree of compensation for the brightness of the high-DBV displayed picture, thereby reducing the probability of spots that occur to the displayed picture after the brightness is compensated. When the brightness for the display panel to display a picture is low (that is, the display panel displays a low-DBV displayed picture), the brightness can be compensated of the image to be displayed by the display panel by using a compensation function with a high degree of brightness compensation, which can then increase the degree of compensation for the brightness of the low-DBV displayed picture, thereby reducing the probability that dark lines occurring in the displayed picture after the brightness is compensated cannot be completely eliminated. In this way, the effect of compensating for the brightness for displaying the picture of the display panel can be effectively improved, which can then improve the effect of the picture of the display panel after the brightness is compensated.

Figure 6:
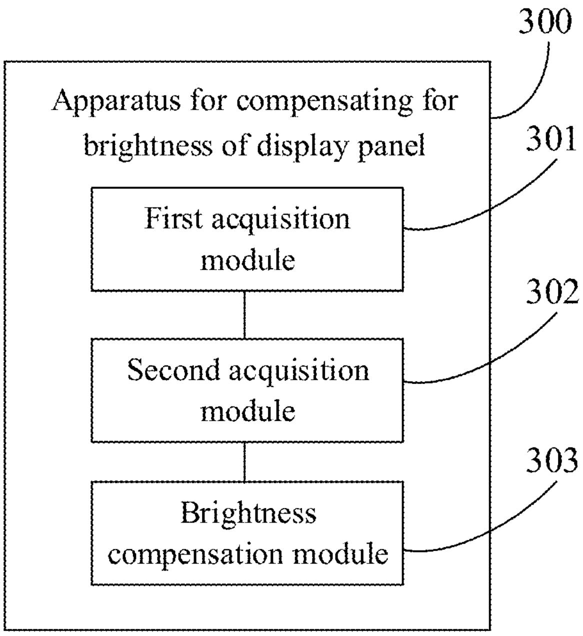
FIG. 6 is a structural block diagram of an apparatus for compensating for brightness of a display panel according to an embodiment of the present application.

Referring to FIG. 6, it is a structural block diagram of an apparatus for compensating for brightness of a display panel according to an embodiment of the present application. The apparatus for compensating for the brightness of the display panel may be integrated in the display device, and the apparatus 300 for compensating for the brightness of the display panel may include:

- a first acquisition module 301 configured to acquire a brightness value of the display panel when the display panel is displaying a picture;
- a second acquisition module 302 configured to acquire, based on the brightness value of the display panel, a compensation function corresponding to the brightness value, and compensation parameters of the compensation function; and
- a brightness compensation module 303 configured to compensate for the brightness of an image to be displayed by the display panel by using the compensation function corresponding to the brightness value.

The a degree at which the brightness of the image to be displayed by the display panel is compensated is negatively correlated with the brightness value of the display panel.

Optionally, the second acquisition module 302 is configured to: acquire the compensation function corresponding to the brightness value, based on the brightness value of the display panel and the first corresponding relationship between brightness values of the display panel and compensation functions; and acquire the compensation parameters of the compensation function corresponding to the brightness value, based on the brightness value of the display panel and the second corresponding relationship between the brightness values of the display panel and groups of compensation parameters.

Figure 7:
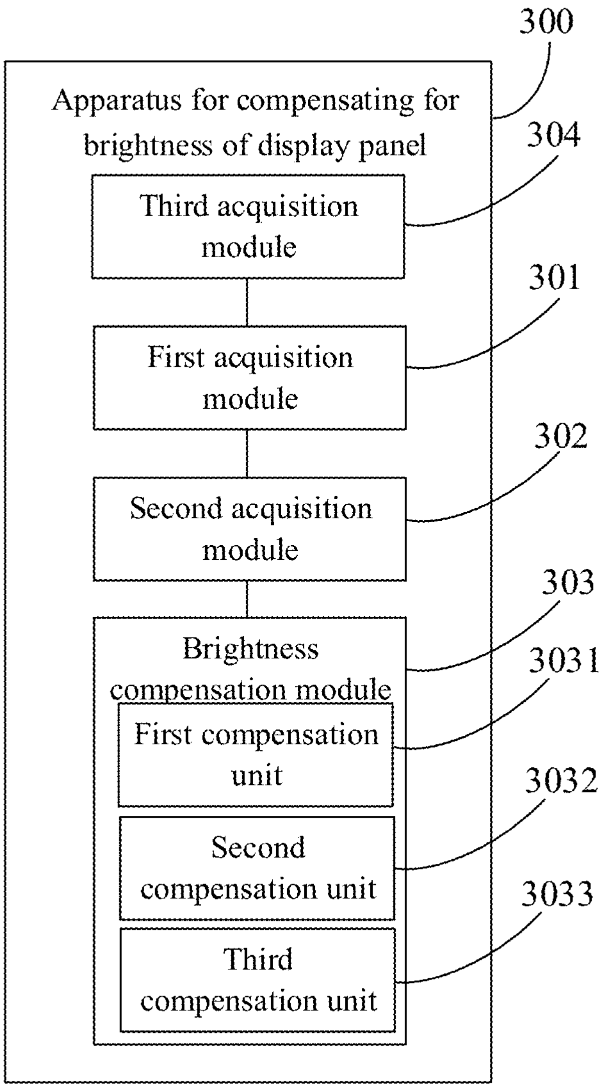
FIG. 7 is a structural block diagram of another apparatus for compensating for brightness of a display panel according to an embodiment of the present application.

Optionally, as shown in FIG. 7, it is a structural block diagram of another apparatus for compensating for brightness of a display panel according to an embodiment of the present application. The brightness compensation module 303 may include:

- a first compensation unit 3031 configured to compensate for the brightness of the image to be displayed by the display panel by using a first compensation function, after the brightness value of the display panel is determined to be within a first brightness range based on the brightness value of the display panel; and
- a second compensation unit 3032 configured to compensate for the brightness of the image to be displayed by the display panel by using a second compensation function, after the brightness value of the display panel is determined to be within a second brightness range based on the brightness value of the display panel.

The first corresponding relationship is recorded as: a corresponding relationship between the first brightness range and the first compensation function, and a corresponding relationship between the second brightness range and the second compensation function. A lower limit value of the first brightness range is greater than an upper limit value of the second brightness range, and a degree at which the brightness of the image to be displayed by the display panel is compensated by using the first compensation function is smaller than a degree at which the brightness of the image to be displayed by the display panel is compensated by using the second compensation function.

Optionally, the first compensation function is: Y=Gain*X*G'+Offset*O';

Here, Y represents a grayscale after the brightness is compensated; X represents a grayscale before the brightness is compensated; Gain and Offset are both compensation parameters; G' is a gain adjustment parameter for the compensation parameter Gain; and O' is a gain adjustment parameter for the compensation parameter Offset.

Optionally, the second compensation function is: $Y=Beta*X^2*B'+Gain*X*G'+Offset*O'$;

Here, Y represents a grayscale after the brightness is compensated; X represents a grayscale before the brightness is compensated; Beta, Gain, and Offset are all compensation parameters; B' is a gain adjustment parameter for the compensation parameter Bet; G' is a gain adjustment parameter for the compensation parameter Gain; and O' is a gain adjustment parameter for the compensation parameter Offset.

Optionally, the brightness compensation module 303 may further include:

- a third compensation unit 3033 configured to compensate for the brightness of the image to be displayed by the display panel by using a third compensation function after the brightness value of the display panel is determined to be within a third brightness range based on the brightness value of the display panel.

The first corresponding relationship is further recorded as: a corresponding relationship between the third brightness range and the third compensation function, and an upper limit value of the third brightness range is smaller than an upper limit value of the first brightness range, and greater than the upper limit value of the second brightness range.

Optionally, the third compensation function is: $Y=Beta*X^2+Gain*X+Offset*O'$.

Here, Y is a grayscale after the brightness is compensated; X is a grayscale before the brightness is compensated; Beta, Gain, and Offset are all compensation parameters of the third compensation function; and O' is a gain adjustment parameter for the compensation parameter Offset.

Optionally, as shown in FIG. 7, the apparatus 300 for compensating for the brightness of the display panel may further include:

- a third acquisition module 304 configured to acquire a first corresponding relationship for recording brightness of a display panel and a compensation function, and a second corresponding relationship for recording the brightness of the display panel and compensation parameters of the compensation function.

In summary, according to the apparatus for compensating for the brightness of the display panel according to the embodiments of the present application, the brightness value of the display panel is acquired when the display panel is displaying a picture; a corresponding compensation function is acquired according to the brightness of the display panel; and the brightness is compensated of an image to be displayed by the display panel, according to the corresponding compensation function. In this way, when the brightness for the display panel to display a picture is high (that is, the display panel displays a high-DBV displayed picture), the brightness can be compensated of the image to be displayed by the display panel by using a compensation function with a low degree of brightness compensation, which can then reduce the probability of a compensation transition problem that occurs when the brightness is compensated for the high-DBV displayed picture. When the brightness for the display panel to display a picture is high (that is, the display panel displays a high-DBV displayed picture), the brightness can be compensated of the image to be displayed by the display panel by using a compensation function with a low degree of brightness compensation, which can then reduce the degree of compensation for the brightness of the high-DBV displayed picture, thereby reducing the probability of spots that occur to the displayed picture after the brightness is compensated. When the brightness for the display panel to display a picture is low (that is, the display panel displays a low-DBV displayed picture), the brightness can be compensated of the image to be displayed by the display panel by using a compensation function with a high degree of brightness compensation, which can then increase the degree of compensation for the brightness of the low-DBV displayed picture, thereby reducing the probability that dark lines occurring in the displayed picture after the brightness is compensated cannot be completely eliminated. In this way, the effect of compensating for the brightness for displaying the picture of the display panel can be effectively improved, which can then improve the effect of the picture of the display panel after the brightness is compensated.

A person skilled in the art may clearly understand that for the convenience and brevity of the description, a reference may be made to the corresponding processes in the forgoing method embodiments for the specific working processes of the apparatus, modules, and units as described above, the details of which will not be repeated herein.

An embodiment of the present application further provides a display device. The display device may include: a display panel, a processor, and a memory configured to store at least one instruction executable by the processor. Here, the processor is configured to execute the method for compensating for the brightness of the display panel as shown in FIG. 3 or FIG. 4.

An embodiment of the present application further provides a computer-readable storage medium. The computer-readable storage medium stores at least one instruction therein. When the computer-readable storage medium runs on a processing component, the processing component is caused to execute the method for compensating for the brightness of the display panel as shown in FIG. 3 or FIG. 4.

In the present application, the terms "first" and "second" are for descriptive purposes only and shall not be construed as indicating or implying relative importance. The term "a plurality of" refers to two or more, unless otherwise specifically defined.

Those of ordinary skills in the art can understand that all or part of the steps in the above embodiments may be implemented by hardware, or by a program to instruct related hardware. The program may be stored in a computer-readable storage medium. The above storage medium may be a read-only memory, a magnetic disk or an optical disk and the like.

Described above are merely optional embodiments of the present application, and are not intended to limit the present application. Within the spirit and principles of the application, any modifications, equivalent substitutions, improvements, and the like should be included within the protection scope of the present application.

What is claimed is:

1. A method for compensating for brightness of a display panel, comprising:

acquiring a brightness value of the display panel;

acquiring, based on the brightness value of the display panel, a compensation function corresponding to the brightness value, and compensation parameters of the compensation function; and compensating for brightness of an image to be displayed by the display panel by using the compensation function corresponding to the brightness value;

wherein a degree at which the brightness of the image to be displayed by the display panel is compensated is negatively correlated with the brightness value of the display panel, wherein acquiring, based on the brightness value of the display panel, the compensation function corresponding to the brightness value, and the compensation parameters of the compensation function comprises:

acquiring the compensation function corresponding to the brightness value, based on the brightness value of the display panel and a first corresponding relationship between brightness values of the display panel and compensation functions; and acquiring the compensation parameters of the compensation function corresponding to the brightness value, based on the brightness value of the display panel and a second corresponding relationship between the brightness values of the display panel and groups of compensation parameters, wherein compensating for the brightness of the image to be displayed by the display panel by using the compensation function corresponding to the brightness value comprises:

compensating for the brightness of the image to be displayed by the display panel by using a first compensation function, after the brightness value of the display panel is determined to be within a first brightness range based on the brightness value of the display panel; and compensating for the brightness of the image to be displayed by the display panel by using a second compensation function, after the brightness value of the display panel is determined to be within a second brightness range based on the brightness value of the display panel, wherein the first corresponding relationship comprises: a corresponding relationship between the first brightness range and the first compensation function, and a corresponding relationship between the second brightness range and the second compensation function; and a lower limit value of the first brightness range is greater than an upper limit value of the second brightness range, and a degree at which the brightness of the image to be displayed by the display panel is compensated by using the first compensation function is smaller than a degree at which the brightness of the image to be displayed by the display panel is compensated by using the second compensation function.

2. The method according to claim 1, wherein the first compensation function is:

$$Y = \text{Gain} * X * G' + \text{Offset} * O';$$

wherein Y is a grayscale of the image after the brightness of the image is compensated; X is a grayscale of the image before the brightness of the image is compensated; each of Gain, Offset, G' and O' is one of compensation parameters of the first compensation function.

3. The method according to claim 1, wherein the second compensation function is:

$$Y = \text{Beta} * X2 * B' + \text{Gain} * X * G' + \text{Offset} * O';$$

wherein Y is a grayscale of the image after the brightness of the image is compensated; X is a grayscale of the image before the brightness of the image is compensated; each of Beta, Gain, Offset, B', G' and O' is one of compensation parameters of the second compensation function.

4. The method according to claim 1, wherein compensating for the brightness of the image to be displayed by the display panel by using the compensation function corresponding to the brightness value further comprises:

compensating for the brightness of the image to be displayed by the display panel by using a third compensation function, after the brightness value of the display panel is determined to be within a third brightness range based on the brightness value of the display panel;

wherein the first corresponding relationship further comprises: a corresponding relationship between the third brightness range and the third compensation function, and an upper limit value of the third brightness range is smaller than an upper limit value of the first brightness range, and greater than the upper limit value of the second brightness range.

5. The method according to claim 4, wherein the third compensation function is:

$$Y = \text{Beta} * X^2 + \text{Gain} * X + \text{Offset} * O';$$

wherein Y is a grayscale of the image after the brightness of the image is compensated; X is a grayscale of the image before the brightness of the image is compensated; each of Beta, Gain, Offset and O' is one of compensation parameters of the third compensation function.

6. The method according to claim 1, wherein before acquiring the brightness value of the display panel, the method further comprises:

acquiring a first corresponding relationship between brightness values of the display panel and compensation functions, and a second corresponding relationship between the brightness values of the display panel and groups of compensation parameters.

7. An apparatus for compensating for brightness of a display panel, comprising:

a first acquisition module configured to acquire a brightness value of the display panel;

a second acquisition module configured to acquire, based on the brightness value of the display panel, a compensation function corresponding to the brightness value, and compensation parameters of the compensation function; and a brightness compensation module configured to compensate for brightness of an image to be displayed by the display panel by using the compensation function corresponding to the brightness value;

wherein a degree at which the brightness of the image to be displayed by the display panel is compensated is negatively correlated with the brightness value of the display panel, wherein the second acquisition module is configured to:

acquire the compensation function corresponding to the brightness value, based on the brightness value of the display panel and a first corresponding relationship between brightness values of the display panel and compensation functions; and acquire the compensation parameters of the compensation function corresponding to the brightness value, based on the brightness value of the display panel and a second corresponding relationship between the brightness values of the display panel and groups of compensation parameters, wherein the brightness compensation module comprises:

a first compensation unit configured to compensate for the brightness of the image to be displayed by the display panel by using a first compensation function, after the brightness value of the display panel is determined to be within a first brightness range based on the brightness value of the display panel; and a second compensation unit configured to compensate for the brightness of the image to be displayed by the display panel by using a second compensation function, after the brightness value of the display panel is determined to be within a second brightness range based on the brightness value of the display panel, wherein the first corresponding relationship comprises: a corresponding relationship between the first brightness range and the first compensation function, and a corresponding relationship between the second brightness range and the second compensation function; and a lower limit value of the first brightness range is greater than an upper limit value of the second brightness range, and a degree at which the brightness of the image to be displayed by the display panel is compensated by using the first compensation function is smaller than a degree at which the brightness of the image to be displayed by the display panel is compensated by using the second compensation function.

8. The apparatus according to claim 7, wherein the first compensation function is:

$$Y = \text{Gain} * X * G' + \text{Offset} * O';$$

wherein Y is a grayscale of the image after the brightness of the image is compensated; X is a grayscale of the image before the brightness of the image is compensated; each of Gain, Offset, G' and O' is one of compensation parameters of the first compensation function; and the second compensation function is:

$$Y = \text{Beta} * X^2 * B' + \text{Gain} * X * G' + \text{Offset} * O';$$

wherein Y is a grayscale of the image after the brightness of the image is compensated; X is a grayscale of the image before the brightness of the image is compensated; each of Beta, Gain, Offset, B', G' and O' is one of compensation parameters of the second compensation function.

9. The apparatus according to claim 7, wherein the brightness compensation module further comprises:

a third compensation unit configured to compensate for the brightness of the image to be displayed by the display panel by using a third compensation function after the brightness value of the display panel is determined to be within a third brightness range based on the brightness value of the display panel;

wherein the first corresponding relationship further comprises: a corresponding relationship between the third brightness range and the third compensation function, and an upper limit value of the third brightness range is smaller than an upper limit value of the first brightness range, and greater than the upper limit value of the second brightness range.

10. A display device, comprising: a display panel, a processor, and a memory for storing at least one executable instruction of the processor, wherein the processor is configured to execute a method for compensating for brightness of a display panel, and the method comprise:

acquiring a brightness value of the display panel;

acquiring, based on the brightness value of the display panel, a compensation function corresponding to the brightness value, and compensation parameters of the compensation function; and compensating for brightness of an image to be displayed by the display panel by using the compensation function corresponding to the brightness value;

wherein a degree at which the brightness of the image to be displayed by the display panel is compensated is negatively correlated with the brightness value of the display panel, wherein acquiring, based on the brightness value of the display panel, the compensation function corresponding to the brightness value, and the compensation parameters of the compensation function comprises:

acquiring the compensation function corresponding to the brightness value, based on the brightness value of the display panel and a first corresponding relationship between brightness values of the display panel and compensation functions; and acquiring the compensation parameters of the compensation function corresponding to the brightness value, based on the brightness value of the display panel and a second corresponding relationship between the brightness values of the display panel and groups of compensation parameters, wherein compensating for the brightness of the image to be displayed by the display panel by using the compensation function corresponding to the brightness value comprises:

compensating for the brightness of the image to be displayed by the display panel by using a first compensation function, after the brightness value of the display panel is determined to be within a first brightness range based on the brightness value of the display panel; and compensating for the brightness of the image to be displayed by the display panel by using a second compensation function, after the brightness value of the display panel is determined to be within a second brightness range based on the brightness value of the display panel, wherein the first corresponding relationship comprises: a corresponding relationship between the first brightness range and the first compensation function, and a corresponding relationship between the second brightness range and the second compensation function; and a lower limit value of the first brightness range is greater than an upper limit value of the second brightness range, and a degree at which the brightness of the image to be displayed by the display panel is compensated by using the first compensation function is smaller than a degree at which the brightness of the image to be displayed by the display panel is compensated by using the second compensation function.

11. A non-transitory computer-readable storage medium, storing at least one instruction executable by a processor; wherein the at least one instruction, when loaded and executed by the processor, causes the processor to perform the method according to claim 1.

12. The display device according to claim 10, wherein the first compensation function is:

$$Y=\text{Gain}*X*G'+\text{Offset}*O';$$

wherein Y is a grayscale of the image after the brightness of the image is compensated; X is a grayscale of the image before the brightness of the image is compensated; each of Gain, Offset, G' and O' is one of compensation parameters of the first compensation function;

and the second compensation function is:

$$Y=\text{Beta}*X2*B'+\text{Gain}*X*G'+\text{Offset}*O';$$

wherein Y is a grayscale of the image after the brightness of the image is compensated; X is a grayscale of the image before the brightness of the image is compensated; each of Beta, Gain, Offset, B', G' and O' is one of compensation parameters of the second compensation function.

13. The display device according to claim 10, wherein compensating for the brightness of the image to be displayed by the display panel by using the compensation function corresponding to the brightness value further comprises:

compensating for the brightness of the image to be displayed by the display panel by using a third compensation function, after the brightness value of the display panel is determined to be within a third brightness range based on the brightness value of the display panel;

wherein the first corresponding relationship further comprises: a corresponding relationship between the third brightness range and the third compensation function, and an upper limit value of the third brightness range is smaller than an upper limit value of the first brightness range, and greater than the upper limit value of the second brightness range.

14. The display device according to claim 13, wherein the third compensation function is:

$$Y = \text{Beta}*X2+\text{Gain}*X+\text{Offset}*O';$$

wherein Y is a grayscale of the image after the brightness of the image is compensated; X is a grayscale of the image before the brightness of the image is compensated; each of Beta, Gain, Offset and O' is one of compensation parameters of the third compensation function.

* * * * *